C. H. KEIFFER.
TIRE.
APPLICATION FILED JAN. 25, 1909.
925,580.
Patented June 22, 1909.
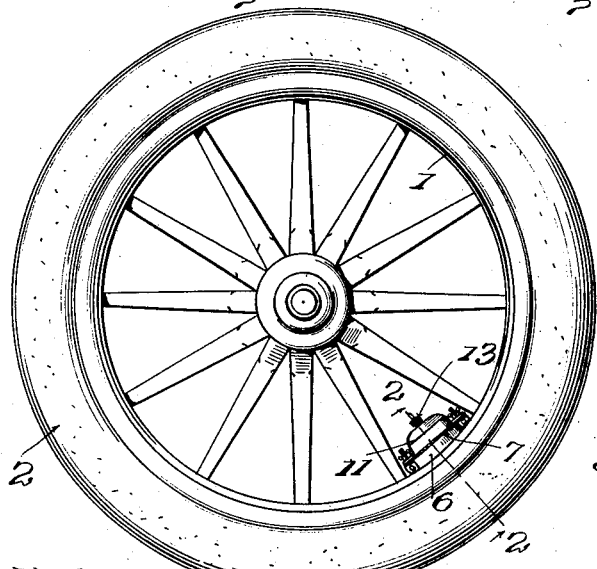
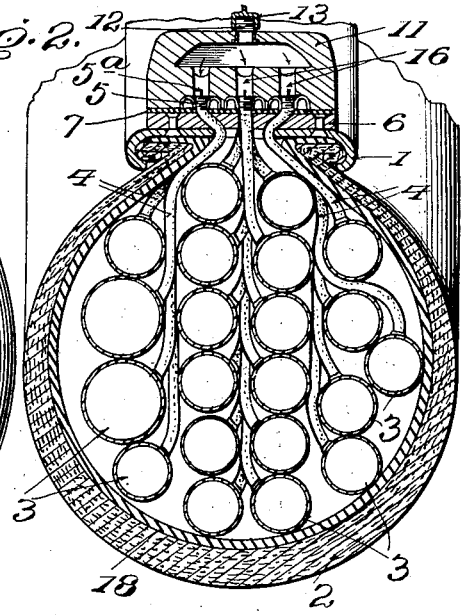
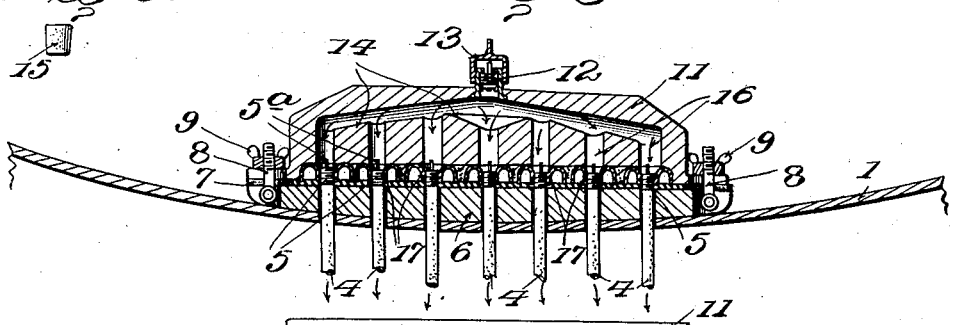
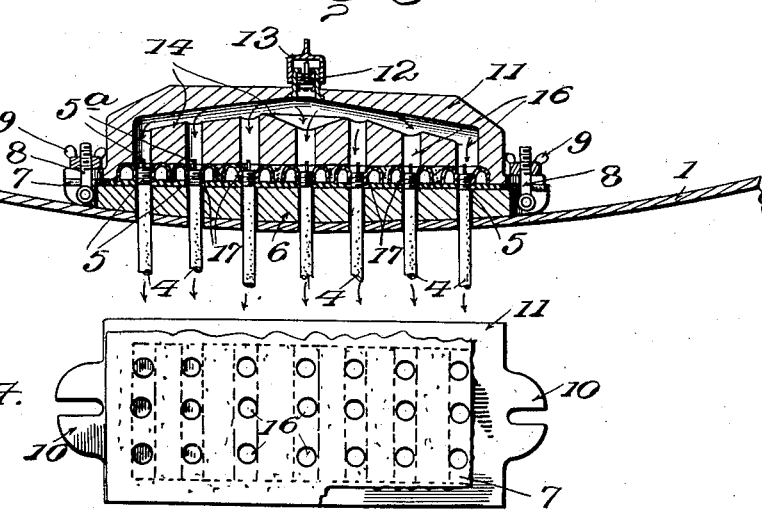
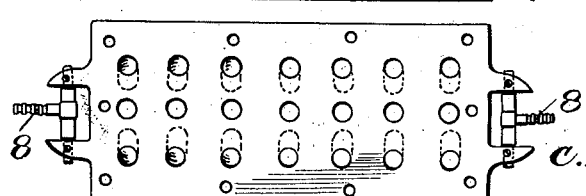
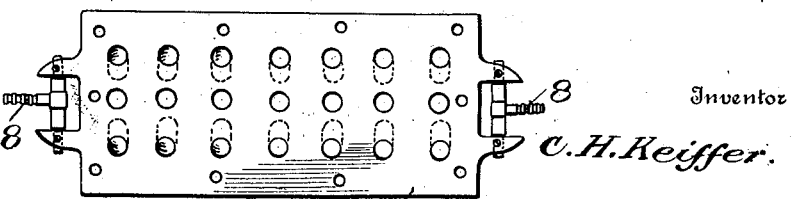
Witnesses
Inventor
C. H. Keiffer.
By
Attorneys

UNITED STATES PATENT OFFICE.

CHARLES H. KEIFFER, OF AKRON, OHIO.

TIRE.

No. 925,580.    Specification of Letters Patent.    Patented June 22, 1909.

Application filed January 25, 1909. Serial No. 474,189.

*To all whom it may concern:*

Be it known that I, CHARLES H. KEIFFER, a citizen of the United States, residing at Akron, in the county of Summit and State of Ohio, have invented certain new and useful Improvements in Tires, of which the following is a specification.

The present invention relates to certain new and useful improvements in pneumatic tires such as are employed in connection with automobiles and the like, and the object of the invention is the provision of a novel tire of this character embodying an outer tube and a series of independent inner tubes which are so arranged that should one or more of the inner tubes be punctured the remaining inner tubes can be readily inflated and the tire expanded to the desired tightness. With such a construction the automobile or other machine in connection with which the tire is employed is not put out of commission as soon as one of the inner tubes becomes punctured, but can continue upon the trip as soon as the remaining inner tubes have been pumped up to the desired hardness, the puncture being repaired at some convenient time when the machine is not in use.

For a full understanding of the invention and the merits thereof and also to acquire a knowledge of the details of construction and the means for effecting the result, reference is to be had to the following description and accompanying drawings, in which:

Figure 1 is a side elevation of a wheel provided with a pneumatic tire constructed in accordance with the invention; Fig. 2 is an enlarged transverse sectional view through the rim of the wheel on the line 2—2 of Fig. 1; Fig. 3 is an enlarged longitudinal sectional view through the valve mechanism of the tire; Fig. 4 is a bottom plan view of the cap; Fig. 5 is a top plan view of the plate to which the cap is applied; Fig. 6 is a side elevation of a plug employed in connection with the improved valve.

Corresponding and like parts are referred to in the following description and indicated in all the views of the drawings by the same reference characters.

Specifically describing the present embodiment of the invention, the numeral 1 designates the rim of a wheel, and 2 an outer tube which is detachably applied to the rim, the said outer tube being preferably of the clencher type so that access can be readily had to the interior thereof when it is removed from the rim.

Arranged within the outer tube 2 is a series of independent inner tubes 3 which may be of any desired size, the number of the inner tubes depending upon the size of the outer tube within which they are placed. Each of these inner tubes is provided with an independent valve tube 4 and valve 5, the said valves being of the conventional construction and being formed with the stems $5^a$ which enable the valves to be opened to determine whether or not the inner tube has been punctured or is still intact. If the hissing noise caused by the escape of air is heard when the stem $5^a$ is pressed inwardly, it indicates that the tube is still in operative condition, while should no hissing noise be heard when the stem is pressed inwardly, it would indicate that the tube had been punctured and was no longer maintaining air under pressure. The valve tubes 4 of the various inner tubes 3 extend through the rim 1 and also through suitable openings in a plate 6 which is secured to the rim and a rubber pad 7 which is applied to the plate. Hinged to opposite ends of the plate 6 are the threaded stems 8 which are capped by the thumb nuts 9 and are designed to engage slotted ears 10 upon a cap 11 which receives the inner ends of all of the valve tubes 4. This cap 11 is formed with a valve opening 12 to which an air pump is designed to be applied in the usual manner when inflating the tire, and a screw cap 13 is provided for normally closing the valve opening. In the specific construction of the cap 11 it will be observed that the same is in the form of a chamber the bottom of which is provided with a series of openings 16 leading to the respective valve tubes, inclined faces 14 being provided adjacent the inner ends of the openings to cause an even distribution of air from the cap to the inner tubes. Attention is also directed to the fact that the inner face of the cap 11 is recessed to receive the nuts 17 which are applied to the extremities of the valve tubes to hold the latter in position. The various inner tubes are bound together at intervals by the binding strips 18 so that there will be no tendency for the same to fall apart and become separate when removed from the outer tube.

Should one or more of the inner tubes be punctured or otherwise injured, the operator removes the cap 11 by loosening the thumb nuts 9 and swinging the stems 8 out of engagement with the slotted ears 10. He then presses inwardly upon the various stems 5ᵃ of the valves 5, and should he fail to hear the hissing noise of escaping air when any of these valve stems are pressed inwardly, the mouth of the corresponding valve 5 is closed with a plug 15. After all of the injured inner tubes have thus been cut off from communication with the chamber upon the interior of the cap 11, the said cap is replaced in position and a pump applied thereto for inflating the remaining inner tubes. The automobile or other machine to which the tire has been applied can then proceed upon its journey, the injured inner tubes being repaired at some convenient time in the future when the machine is not in use.

Having thus described the invention, what is claimed as new is:

In a tire the combination of a rim, an outer tube disposed on said rim, a plurality of inner tubes independently positioned within said outer tube, a perforated plate positioned against the inner face of said rim, a plurality of air tubes extended from said inner tubes and terminated in said plate, threaded stems hinged upon the opposite ends of said plate, a cap having an air chamber formed therein engaged over said plate in communication with said air tubes, slotted lugs outwardly extended from the opposite ends of said cap for engagement about said threaded stems, nuts disposed on said stems for clamping said lugs in rigid position, an air inlet valve positioned in said cap, a plurality of independent air valves disposed in the ends of said air tubes and a plurality of binding strips disposed about said inner tubes at intervals throughout the tire for the purpose of holding the same in position.

In testimony whereof I affix my signature in presence of two witnesses.

CHARLES H. KEIFFER. [L. S.]

Witnesses:
FRANK MEYERS,
CHAS. CLEMENT.